United States Patent
Hirasawa et al.

(10) Patent No.: US 11,305,770 B2
(45) Date of Patent: Apr. 19, 2022

(54) VEHICLE HAVING CONTROLLABLE TARGET DRIVING FORCE

(71) Applicant: TOYOTA JIDOSHA KABUSHIKI KAISHA, Toyota (JP)

(72) Inventors: Takahiko Hirasawa, Toyota (JP); Keiji Kaita, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 16/837,180

(22) Filed: Apr. 1, 2020

(65) Prior Publication Data
US 2021/0001855 A1    Jan. 7, 2021

(30) Foreign Application Priority Data
Jul. 3, 2019    (JP) .............................. JP2019-124180

(51) Int. Cl.
*B60W 30/00* (2006.01)
*B60W 30/18* (2012.01)
*B60W 10/04* (2006.01)
*B60W 30/20* (2006.01)

(52) U.S. Cl.
CPC ...... *B60W 30/18072* (2013.01); *B60W 10/04* (2013.01); *B60W 30/20* (2013.01); *B60W 2510/0604* (2013.01); *B60W 2520/10* (2013.01)

(58) Field of Classification Search
CPC ........... B60W 30/18072; B60W 10/04; B60W 30/20; B60W 2510/0604; B60W 2520/10
See application file for complete search history.

(56) References Cited

U.S. PATENT DOCUMENTS

| | | | |
|---|---|---|---|
| 2014/0018974 A1* | 1/2014 | Okita | G06F 7/00 701/1 |
| 2018/0178796 A1* | 6/2018 | Fukuda | B60W 30/162 |
| 2019/0217860 A1* | 7/2019 | Kishi | B60W 30/16 |
| 2020/0164870 A1* | 5/2020 | Takahashi | B60W 30/025 |
| 2021/0276550 A1* | 9/2021 | Gotou | B60W 30/143 |

FOREIGN PATENT DOCUMENTS

JP    2013-010426 A    1/2013

* cited by examiner

*Primary Examiner* — Russell Frejd
*Assistant Examiner* — Brittany Renee Peko
(74) *Attorney, Agent, or Firm* — Oliff PLC (57) ABSTRACT

A vehicle includes a drive device for traveling, and a control device configured to control the drive device so that the vehicle travels with a target driving force based on an accelerator operation amount. The control device is configured to set the target driving force such that a change in the target driving force with respect to a change in the accelerator operation amount is gentler in a case where steady traveling is desired as compared with a case where the steady traveling is not desired. Therefore, in a case where the steady traveling is desired, a variation of a vehicle speed with respect to a slight variation of the accelerator operation amount can be gentle and continuous steady traveling can be facilitated.

2 Claims, 6 Drawing Sheets

FIG. 8

VEHICLE HAVING CONTROLLABLE TARGET DRIVING FORCE

INCORPORATION BY REFERENCE

The disclosure of Japanese Patent Application No. 2019-124180 filed on Jul. 3, 2019 including the specification, drawings and abstract is incorporated herein by reference in its entirety.

BACKGROUND

1. Technical Field

The present disclosure relates to a vehicle.

2. Description of Related Art

In the related art, as such a kind of vehicles, a vehicle has been proposed in which acceleration and deceleration of the vehicle is controlled based on an operation position of an accelerator pedal (Japanese Unexamined Patent Application Publication No. 2013-10426 (JP 2013-10426 A)).

SUMMARY

In the vehicle, the acceleration and deceleration changes in a uniform change manner (a change rate) with respect to a change in the operation position of the accelerator pedal, regardless of whether a steady traveling (traveling at a substantially constant vehicle speed) is desired. Therefore, even in a case where the steady traveling is desired, as the operation position of the accelerator pedal changes, the vehicle speed changes quickly to a certain extent, the steady traveling is unlikely to be continued.

The main object of a vehicle of an aspect of the present disclosure is to facilitate continuous steady traveling in a case where the steady traveling is desired.

The vehicle of an aspect of the present disclosure employs the following means to achieve the main object described above.

A first aspect of the present disclosure relates to a vehicle including a drive device for traveling and a control device. The control device is configured to control the drive device so that the vehicle travels with a target driving force based on an accelerator operation amount. The control device is configured to set the target driving force such that a change in the target driving force with respect to a change in the accelerator operation amount is gentler in a case where steady traveling is desired as compared with a case where the steady traveling is not desired.

In the vehicle according to the first aspect, when the drive device is controlled so that the vehicle travels with the target driving force based on the accelerator operation amount, the target driving force is set such that a change in the target driving force with respect to a change in the accelerator operation amount is gentler in a case where steady traveling is desired as compared with a case where the steady traveling is not desired. Accordingly, in a case where the steady traveling is desired, a variation of a vehicle speed with respect to a slight variation of the accelerator operation amount can be gentle and continuous steady traveling can be facilitated.

In the vehicle according to the first aspect, the control device may be configured to determine that the steady traveling is desired in a case where a variation amount of the accelerator operation amount for a predetermined time is equal to or smaller than a first predetermined variation amount and a variation amount of a vehicle speed for the predetermined time is equal to or smaller than a second predetermined variation amount.

In this way, the determination can be made as to whether the steady traveling is desired by using the variation amount of the accelerator operation amount and the variation amount of the vehicle speed.

In the vehicle according to the first aspect, the control device may be configured to set a request driving force for traveling based on the accelerator operation amount and a vehicle speed or a driving force obtained by performing smoothing on the request driving force as the target driving force, and determine that the steady traveling is desired in a case where a difference between the request driving force and travel resistance is equal to or smaller than a predetermined difference. In this way, the determination can be made as to whether the steady traveling is desired by using the difference between the request driving force and the travel resistance.

In the vehicle according to the first aspect, the control device may be configured to determine that the steady traveling is desired in a case where the difference between the request driving force and the travel resistance is equal to or smaller than the predetermined difference and a variation amount of the accelerator operation amount for a predetermined time is equal to or smaller than a predetermined variation amount. In this way, the determination can be more appropriately made as to whether the steady traveling is desired.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment for carrying out the present disclosure will be described.

Figure 1:
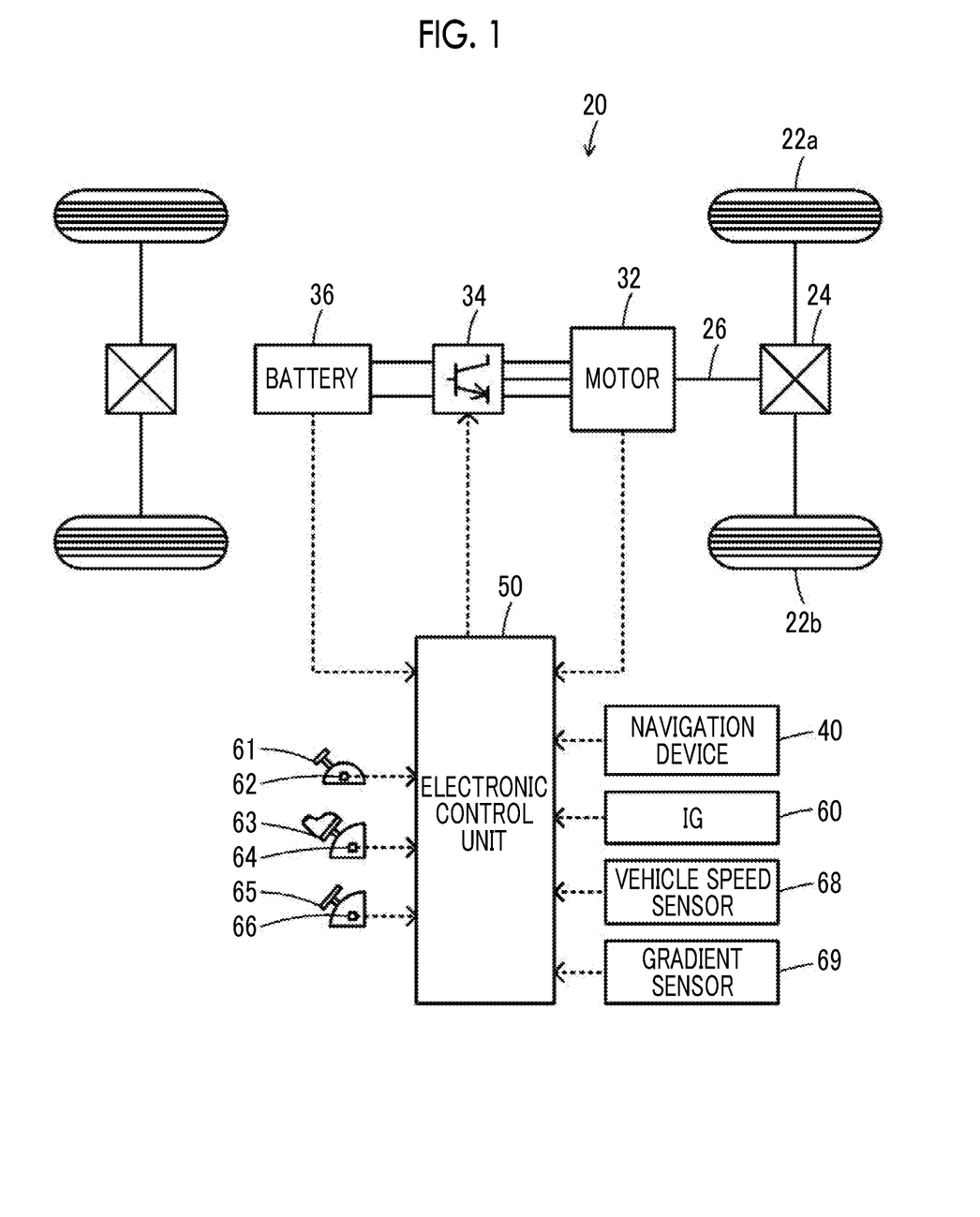
FIG. 1 is a configuration diagram showing an outline of a configuration of an electric vehicle 20 as a first embodiment of the present disclosure.

FIG. 1 is a configuration diagram showing an outline of a configuration of an electric vehicle 20 as a first embodiment of the present disclosure. As shown, the electric vehicle 20 according to the first embodiment includes a motor 32, an inverter 34, a battery 36 as a power storage device, a navigation device 40, and an electronic control unit 50.

The motor 32 is configured as, for example, a synchronous generator motor, and has a rotor connected to a drive shaft 26 that is coupled to the drive wheels 22a, 22b via a differential gear 24. The inverter 34 is used to drive the motor 32 and connected to the battery 36 via a power line. The motor 32 is rotationally driven by switching controlling a plurality of switching elements of the inverter 34 by the electronic control unit 50. The battery 36 is configured as, for example, a lithium ion secondary battery or a nickel hydride secondary battery.

The navigation device 40 includes a main body, a GPS antenna, and a display. The main body includes a CPU, a ROM, a RAM, a storage medium, an input/output port, and a communication port, that are not shown. The storage medium of the main body stores map information and the like. As the map information, service information (for example, sightseeing information or parking lots), road information of each traveling section (for example, between traffic lights or intersections), or the like is stored as a database. The road information includes distance information, width information, lane number information, region information (a city area or a suburb), road kind information (a general road or an expressway), gradient information, a legal speed, or the number of traffic lights. The GPS antenna receives information on the current location of the vehicle. The display is configured as a touch panel display that displays various kinds of information such as information on the current location of the vehicle or a travel scheduled route to the destination and allows a user to input various instructions. The navigation device 40 is connected to the electronic control unit 50 via the communication port.

The electronic control unit 50 is configured as a microprocessor centered on a CPU (not shown). In addition to the CPU, the electronic control unit 50 includes a ROM that stores a processing program, a RAM that temporarily stores data, an input/output port, and a communication port. Signals from various sensors are input to the electronic control unit 50 via the input port. Examples of the signals input to the electronic control unit 50 include a rotational position $\theta m$ of the rotor of the motor 32 from a rotational position sensor that detects the rotational position of the rotor of the motor 32, or phase currents Iu, Iv of the motor 32 from a current sensor that detects each phase current of the motor 32. Examples of the signals input to the electronic control unit 50 also include a voltage Vb of the battery 36 from a voltage sensor attached between terminals of the battery 36, a current Ib of the battery 36 from the current sensor attached to an output terminal of the battery 36, or a temperature Tb of the battery 36 from a temperature sensor attached to the battery 36. Examples of the signals input to the electronic control unit 50 also include an ignition signal from an ignition switch 60, or a shift position SP from a shift position sensor 62 that detects an operation position of a shift lever 61. Examples of the signals input to the electronic control unit 50 also include an accelerator operation amount Acc from an accelerator pedal position sensor 64 that detects a stepping amount of an accelerator pedal 63, a brake pedal position BP from a brake pedal position sensor 66 that detects a stepping amount of a brake pedal 65, a vehicle speed V from a vehicle speed sensor 68, or a road surface gradient Or (the uphill side is defined as positive) from a gradient sensor 69.

The electronic control unit 50 outputs various control signals via the output port. Examples of the signals output from the electronic control unit 50 include a switching control signal to the plurality of switching elements of the inverter 34. The electronic control unit 50 calculates an electrical angle $\theta e$ or a rotation speed Nm of the motor 32 based on the rotational position $\theta m$ of the rotor of the motor 32 from the rotational position sensor. The electronic control unit 50 is connected to the navigation device 40 via the communication port.

Figure 2:
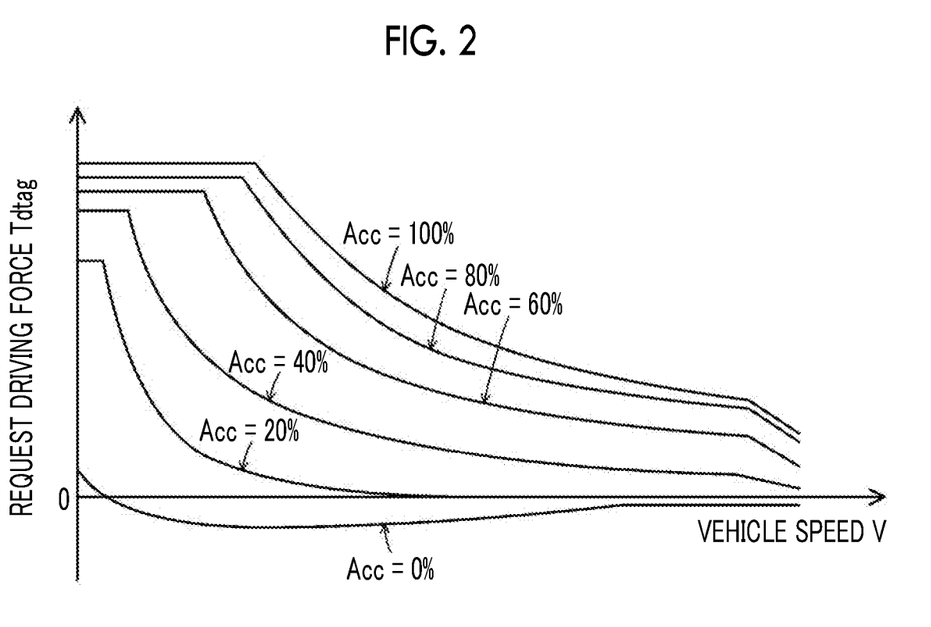
FIG. 2 is an explanatory diagram showing an example of a map for request driving force setting.

In the electric vehicle 20 according to the first embodiment configured as described above, the electronic control unit 50 firstly sets a request driving force Tdtag for traveling based on the accelerator operation amount Acc from the accelerator pedal position sensor 64 and the vehicle speed V from the vehicle speed sensor 68. The request driving force Tdtag is set by a method, for example, in which a relationship between the accelerator operation amount Acc and the vehicle speed V and the request driving force Tdtag is predetermined and stored in the ROM (not shown) as a map for request driving force setting, and when the accelerator operation amount Acc and the vehicle speed V are applied, the corresponding request driving force Tdtag is derived from the map. FIG. 2 is an explanatory diagram showing an example of a map for request driving force setting. Subsequently, the electronic control unit 50 sets a target driving force Td* for traveling based on the request driving force Tdtag, and sets a torque command Tm* of the motor 32 so that the vehicle travels with the set target driving force Td*. The electronic control unit 50 performs switching control of the plurality of switching elements of the inverter 34 so that the motor 32 is driven by the torque command Tm*.

Figure 3:
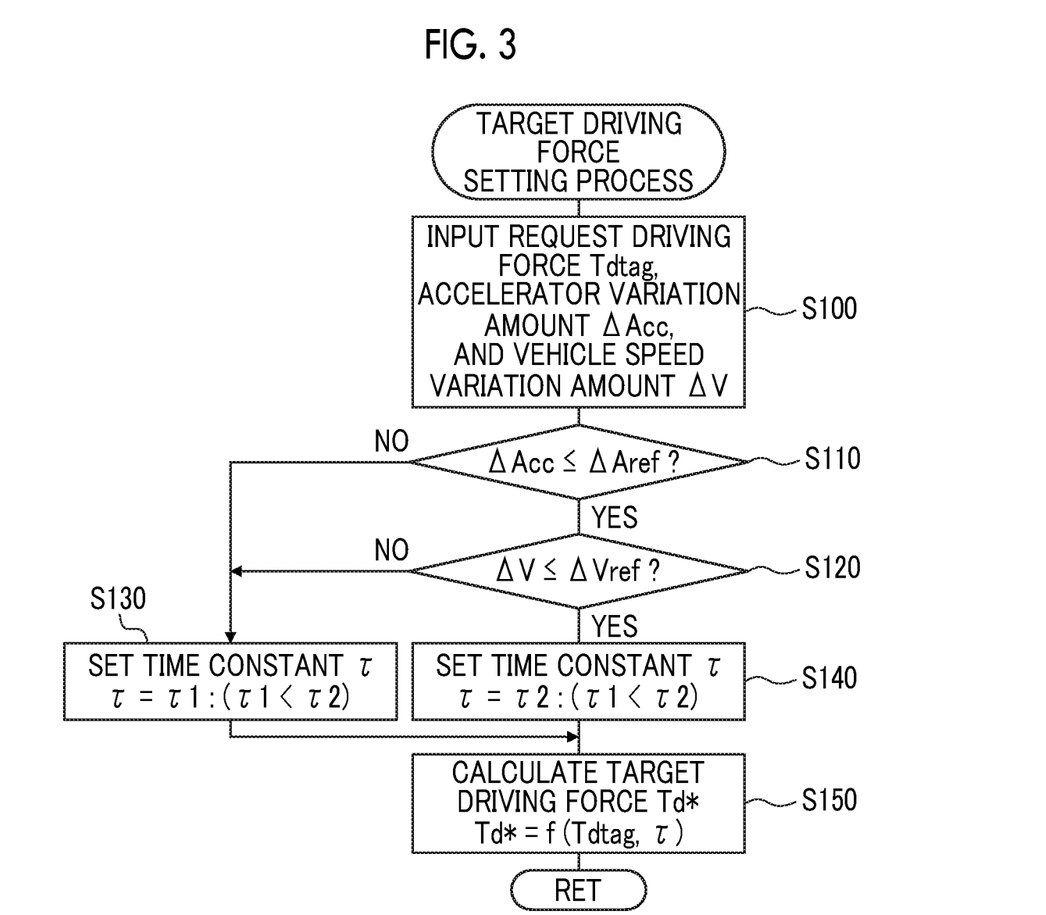
FIG. 3 is a flowchart showing an example of a target driving force setting process executed by an electronic control unit 50.

Next, the operation of the electric vehicle 20 according to the first embodiment configured as described above, in particular, the operation when the target driving force Td* is set based on the request driving force Tdtag will be described. FIG. 3 is a flowchart showing an example of a target driving force setting process executed by the electronic control unit 50. The routine is repeatedly executed.

When the target driving force setting process of FIG. 3 is executed, the electronic control unit 50 firstly inputs data such as the request driving force Tdtag or an accelerator variation amount $\Delta Acc$ and a vehicle speed variation amount $\Delta V$ that are variation amounts of the accelerator operation amount Acc and the vehicle speed V for a predetermined time T1 (for example, about several hundred msec to several sec) (step S100). A value set based on the accelerator operation amount Acc and the vehicle speed V is input as the request driving force Tdtag. A value calculated as a difference between a maximum value and a minimum value of each of the accelerator operation amount Acc and the vehicle speed V for the predetermined time T1 is input as the accelerator variation amount $\Delta Acc$ and the vehicle speed variation amount $\Delta V$.

After the data is input, the input accelerator variation amount $\Delta Acc$ is compared with a threshold value $\Delta Aref$ (step S110) and the vehicle speed variation amount $\Delta V$ is compared with a threshold value $\Delta Vref$ (step S120). The threshold value $\Delta Aref$ is a threshold value used to determine whether a variation of the accelerator operation amount Acc is relatively small, and for example, a value of about 1% to 5% is used. The threshold value $\Delta Vref$ is used to determine whether a variation of the vehicle speed V is relatively small, and for example, a value of about 1 km/h to 5 km/h is used. A case where the variation of the accelerator operation amount Acc and the variation of the vehicle speed V are relatively small is assumed that the driver desires steady traveling. Accordingly, processing of steps S110, S120 can be considered as processing for determining whether the steady traveling is desired.

A case where the accelerator variation amount ΔAcc is greater than the threshold value ΔAref in step S110 or a case where the vehicle speed variation amount ΔV is greater than the threshold value ΔVref in step S120 are determined that the steady traveling is not desired, a predetermined value τ1 that is relatively small is set as a time constant τ used in smoothing (step S130), the request driving force Tdtag is smoothed using the set time constant τ to calculate the target driving force Td* (step S150), and the routine ends. The target driving force Td* can be calculated by Expression (1) using a previous target driving force (previous Td*), the request driving force Tdtag, and the time constant τ, for example.

$$Td^* = \text{previous } Td^* \cdot \tau + Tdtag \cdot (1-\tau) \quad (1)$$

A case where the accelerator variation amount ΔAcc is equal to or smaller than the threshold value ΔAref in step S110 or a case where the vehicle speed variation amount ΔV is equal to or smaller than the threshold value ΔVref in step S120 are determined that the steady traveling is desired, a predetermined value τ2 greater than the predetermined value τ1 is set as a time constant τ used in smoothing (step S140), the request driving force Tdtag is smoothed using the set time constant τ to calculate the target driving force Td* (step S150), and the routine ends. Accordingly, the target driving force Td* is changed gently with respect to a change in the accelerator operation amount Acc (a change of the request driving force Tdtag) in a case where steady traveling is desired as compared with a case where the steady traveling is not desired, and thus a variation of the vehicle speed V can be gentle and continuous steady traveling can be facilitated.

In the electric vehicle 20 according to the first embodiment described above, the request driving force Tdtag is smoothed using the greater time constant τ to calculate the target driving force Td* and the motor 32 is controlled so that the vehicle travels with the target driving force Td* in a case where the steady traveling is desired (a case where the accelerator variation amount ΔAcc is equal to or smaller than the threshold value ΔAref and the vehicle speed variation amount ΔV is equal to or smaller than the threshold value ΔVref), as compared with a case where the steady traveling is not desired (a case where the accelerator variation amount ΔAcc is greater than the threshold value ΔAref and the vehicle speed variation amount ΔV is greater than the threshold value ΔVref). Accordingly, a variation of the vehicle speed V can be gentler with respect to a slight variation in the accelerator operation amount Acc in a case where the steady traveling is desired, and thus continuous steady traveling can be facilitated.

Hereinafter, an electric vehicle 20B according to a second embodiment will be described. The electric vehicle 20B according to the second embodiment has the same hardware configuration as the electric vehicle 20 according to the first embodiment shown in FIG. 1. Therefore, in order to avoid redundant description, the hardware configuration of the electric vehicle 20B according to the second embodiment is denoted by the same reference numerals as the electric vehicle 20 according to the first embodiment firstly described, and detailed description will be omitted.

Subsequently, the operation of the electric vehicle 20B according to the second embodiment will be described. The electronic control unit 50 according to the second embodiment executes a target driving force setting process of FIG. 4 instead of the target driving force setting process of FIG. 3.

Figure 4:
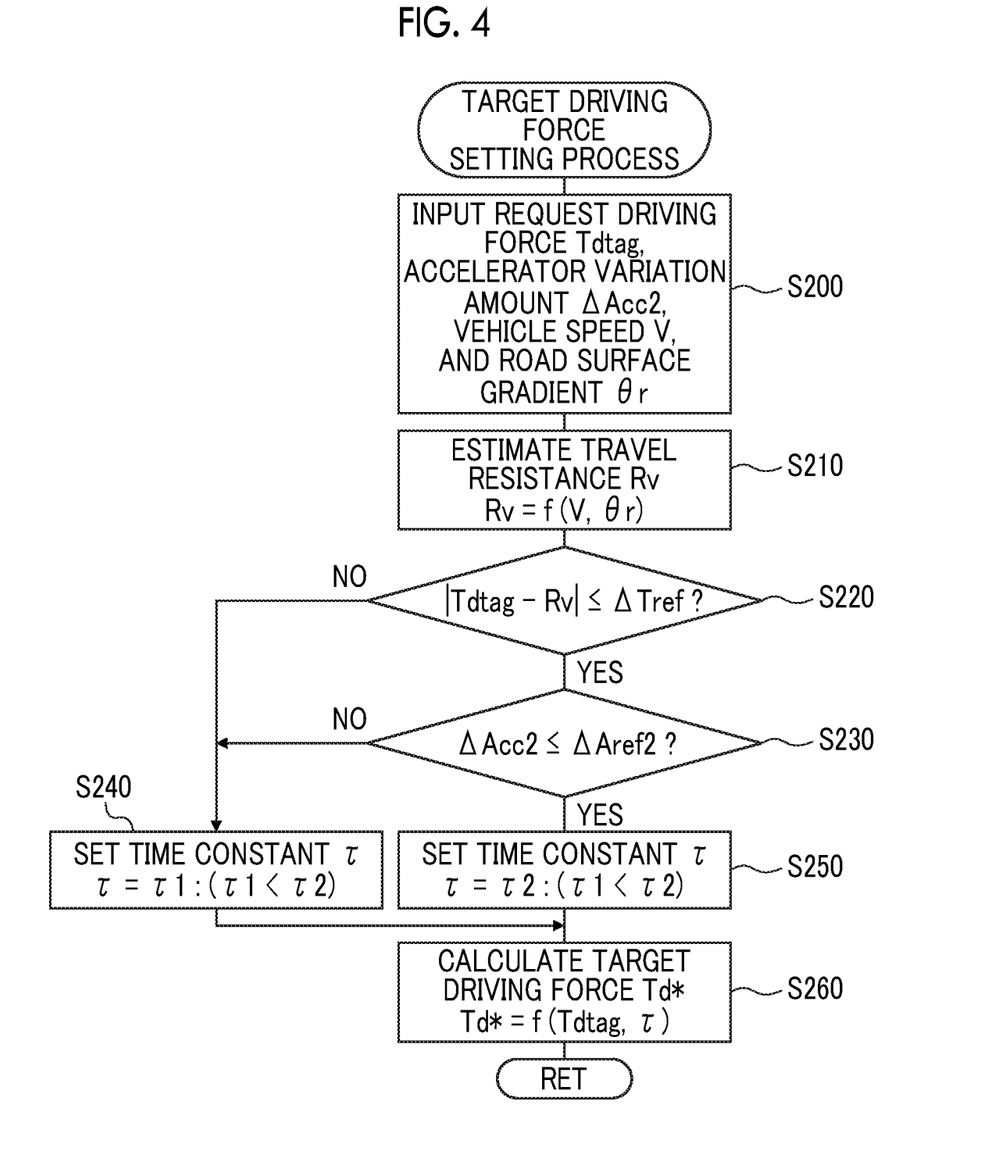
FIG. 4 is a flowchart showing an example of a target driving force setting process according to a modification example.

When the target driving force setting process of FIG. 4 is executed, the electronic control unit 50 firstly inputs data such as the request driving force Tdtag or a second accelerator variation amount ΔAcc2 that is a variation amount of the accelerator operation amount Acc for a predetermined time T2 (for example, about several hundred μsec to several msec), a vehicle speed V, and a road surface gradient θr (the uphill side is defined as positive) (step S200). The request driving force Tdtag is input in the same manner as in the target driving force setting process of FIG. 3. A value calculated as a difference between a maximum value and a minimum value of the accelerator operation amount Acc for the predetermined time T2 is input as the second accelerator variation amount ΔAcc2. A value detected by the vehicle speed sensor 68 is input as the vehicle speed V. A value detected by the gradient sensor 69 is input as the road surface gradient θr.

Figure 5:
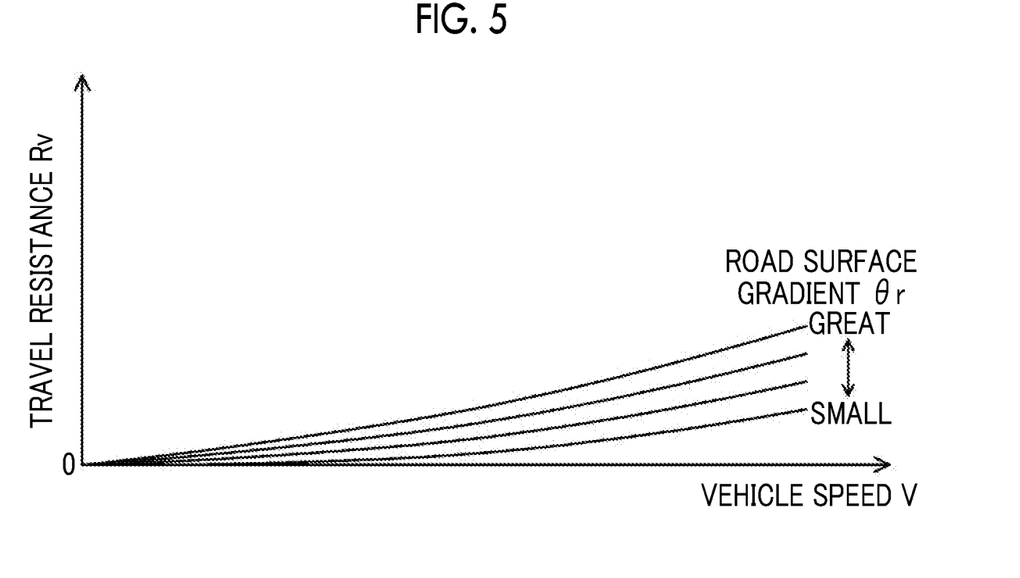
FIG. 5 is an explanatory diagram showing an example of a map for travel resistance estimation.

After the data is input, travel resistance Rv is estimated based on the input vehicle speed V and road surface gradient θr (step S210). The travel resistance Rv is a force acting on the vehicle in a direction opposite to the traveling direction, and the travel resistance Rv includes rolling resistance, air resistance, gradient resistance, acceleration resistance, or the like. In the second embodiment, the travel resistance Rv is estimated by a method, for example, in which a relationship between the vehicle speed V and the road surface gradient θr and the travel resistance Rv is predetermined and stored in the ROM (not shown) as a map for travel resistance estimation, and when the vehicle speed V and the road surface gradient θr are applied, the corresponding travel resistance Rv is derived from the map. FIG. 5 is an explanatory diagram showing an example of a map for travel resistance estimation. As shown, the travel resistance Rv is estimated to increase as the vehicle speed V increases, and to increase as the road surface gradient θr increases toward the uphill road side.

Subsequently, a difference between the request driving force Tdtag and the travel resistance Rv is compared with the threshold value ΔTref (step S220) and the second accelerator variation amount ΔAcc2 is compared with the threshold value ΔAref2 (step S230). The threshold value ΔTref is a threshold value used to determine whether the request driving force Tdtag (a force in the traveling direction) and the travel resistance Rv (a force in the opposite direction of the traveling direction) are balanced to a certain extent, and for example, a value of about 1 Nm to 5 Nm is used. The threshold value ΔAref2 is a threshold value used to determine whether the driver has performed a sudden accelerator operation (stepping on or stepping back), and for example, a value of about 1 km/h to 5 km/h is used. A case where the request driving force Tdtag and the travel resistance Rv are balanced to a certain extent and the driver does not perform a sudden accelerator operation is assumed that the driver desires the steady traveling. Accordingly, processing of steps S220, S230 can be considered as processing for determining whether the steady traveling is desired.

A case where the difference between the request driving force Tdtag and the travel resistance Rv is greater than the threshold value ΔTref in step S220 or a case where the second accelerator variation amount ΔAcc2 is greater than the threshold value ΔAref2 in step S230 are determined that the steady traveling is not desired, a predetermined value τ1 that is relatively small is set as a time constant τ used in smoothing (step S240), the request driving force Tdtag is smoothed using the set time constant τ to calculate the target driving force Td* (step S260), and the routine ends. The target driving force Td* can be calculated by Expression (1) using the previous target driving force (previous Td*) and the request driving force Tdtag and the time constant τ, for example.

A case where the difference between the request driving force Tdtag and the travel resistance Rv is equal to or smaller than the threshold value ΔTref in step S220 or a case where the second accelerator variation amount ΔAcc2 is equal to or smaller than the threshold value ΔAref2 in step S230 are determined that the steady traveling is desired, a predetermined value τ2 greater than the predetermined value τ1 is set as a time constant τ used in smoothing (step S250), the request driving force Tdtag is smoothed using the set time constant τ to calculate the target driving force Td* (step S260), and the routine ends. Accordingly, the target driving force Td* is changed gently with respect to a change in the accelerator operation amount Acc (a change of the request driving force Tdtag) in a case where steady traveling is desired as compared with a case where the steady traveling is not desired, and thus a variation of the vehicle speed V can be gentle and continuous steady traveling can be facilitated.

In the electric vehicle 20B according to the second embodiment described above, the request driving force Tdtag is smoothed using the greater time constant τ to calculate the target driving force Td* and the motor 32 is controlled so that the vehicle travels with the target driving force Td* in a case where the steady traveling is desired (a case where the difference between the request driving force Tdtag and the travel resistance Rv is equal to or smaller than the threshold value ΔTref and the second accelerator variation amount ΔAcc2 is equal to or smaller than the threshold value ΔAref2), as compared with a case where the steady traveling is not desired (a case where the difference between the request driving force Tdtag and the travel resistance Rv is greater than the threshold value ΔTref and the second accelerator variation amount ΔAcc2 is greater than the threshold value ΔAref2). Accordingly, a variation of the vehicle speed V can be gentler with respect to a slight variation in the accelerator operation amount Acc in a case where the steady traveling is desired, and thus continuous steady traveling can be facilitated.

In the electric vehicle 20B according to the second embodiment, the determination is made as to whether the steady traveling is desired based on the difference between the request driving force Tdtag and the travel resistance Rv, and the second accelerator variation amount ΔAcc2. However, the determination may be made as to whether the steady traveling is desired based on only the difference between the request driving force Tdtag and the travel resistance Rv without considering the second accelerator variation amount ΔAcc2.

In the electric vehicle 20B according to the second embodiment, the travel resistance Rv is estimated based on the vehicle speed V and the road surface gradient θr from the gradient sensor 69. However, instead of the road surface gradient θr from the gradient sensor 69, a road surface gradient θr2 extracted based on the current location of the vehicle and the map information (the gradient information) by the navigation device 40 may be used.

In the electric vehicle 20B according to the second embodiment, the travel resistance Rv is estimated based on the vehicle speed V and the road surface gradient θr. However, the travel resistance Rv may be estimated based on only the vehicle speed V without considering the road surface gradient θr.

In the electric vehicles 20, 20B according to the first and second embodiments, the request driving force Tdtag is smoothed using the greater time constant τ to calculate the target driving force Td* in a case where the steady traveling is desired as compared with a case where the steady traveling is not desired. However, the request driving force Tdtag is subjected to rate processing using the smaller rate value Rt to calculate the target driving force Td* in a case where the steady traveling is desired as compared with a case where the steady traveling is not desired. In this case, the target driving force Td* can be calculated by Expression (2) using the previous target driving force (previous Td*) and the request driving force Tdtag and the rate value Rt, for example.

$$Td^* = \max(\min(Td\text{tag}, \text{previous } Td^* + Rt), \text{previous } Td^* - Rt) \quad (2)$$

In the electric vehicles 20, 20B according to the first and second embodiments, in a case where the steady traveling is not desired, the request driving force Tdtag is smoothed using the relatively small time constant τ to calculate the target driving force Td*. In the modification example, in a case where the steady traveling is not desired, the target driving force Td* is calculated by using the relatively great rate value Rt and performing rate processing on the request driving force Tdtag. However, in a case where the steady traveling is not desired, the request driving force Tdtag may be set as the target driving force Td*.

In the electric vehicles 20, 20B according to the first and second embodiments, the battery 36 is used as the power storage device, but a capacitor may be used.

In the first and second embodiments, a configuration of the electric vehicles 20, 20B including the traveling motor 32 and the battery 36 are adopted. However, a configuration of a hybrid vehicle including an engine in addition to the traveling motor 32 and the battery 36 may be adopted, a configuration of a fuel cell vehicle including a fuel cell in addition to the traveling motor 32 and the battery 36 may be adopted, and a configuration of a general engine vehicle including the engine without the motor 32 and the battery 36 may be adopted.

Figure 6:
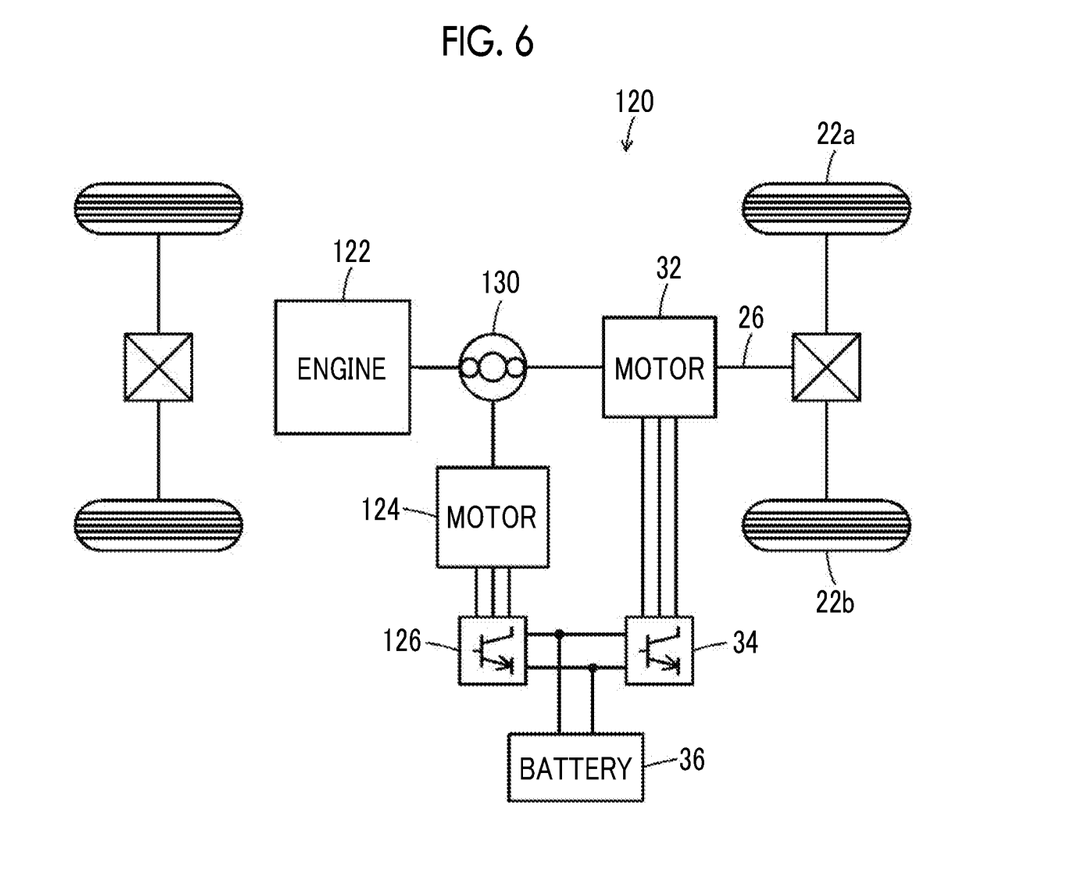
FIG. 6 is a configuration diagram showing an outline of a configuration of a hybrid vehicle 120 according to a modification example.
Figure 7:
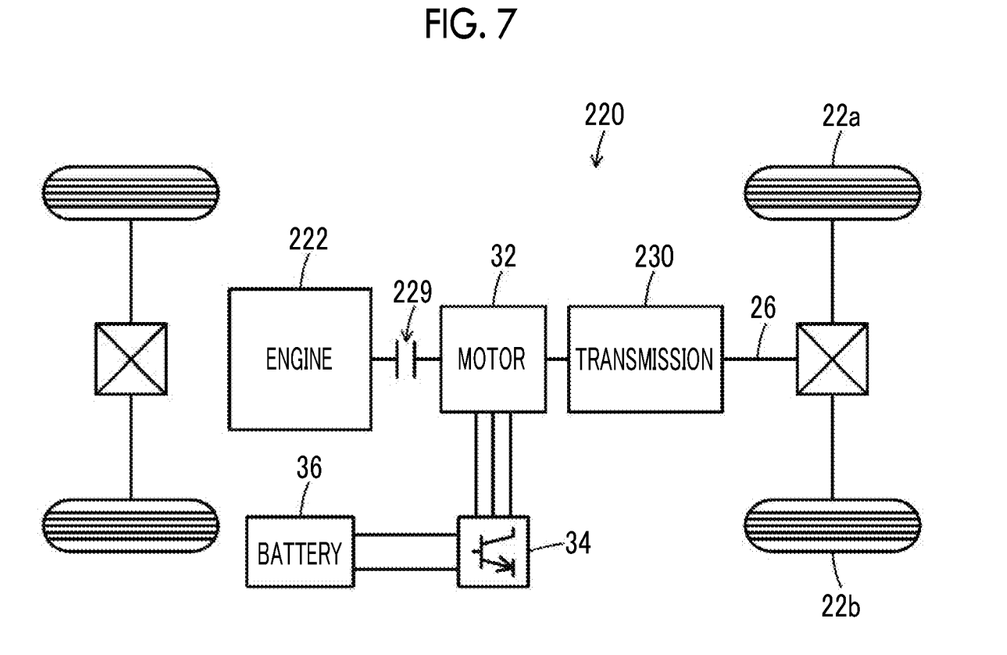
FIG. 7 is a configuration diagram showing an outline of a configuration of a hybrid vehicle 220 according to a modification example.
Figure 8:
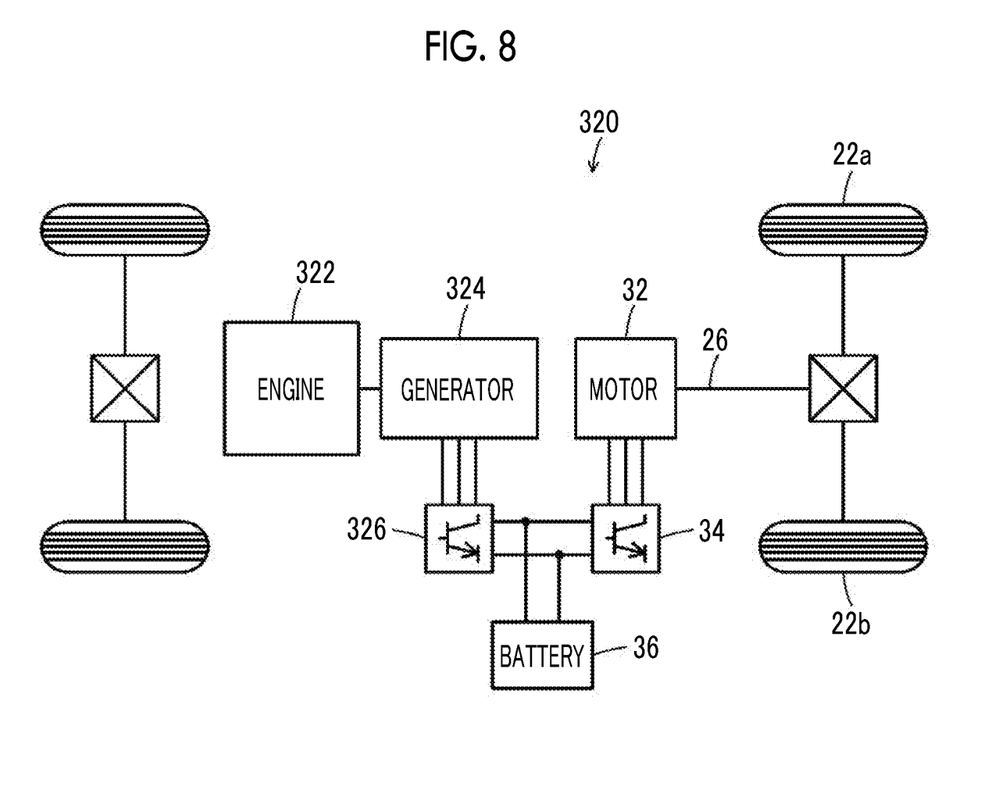
FIG. 8 is a configuration diagram showing an outline of a configuration of a hybrid vehicle 320 according to a modification example.

Example of the hybrid vehicle includes a configuration in which the motor 32 is connected to the drive shaft 26 coupled to the drive wheels 22a, 22b, an engine 122 and the motor 124 are connected to the drive shaft 26 via a planetary gear 130, and the battery 36 is connected to the motors 32, 124 via the inverters 34, 126, as shown in a hybrid vehicle 120 of a modification example in FIG. 6. Example of the hybrid vehicle also includes a configuration in which the motor 32 is connected to the drive shaft 26 coupled to the drive wheels 22a, 22b via transmission 230, an engine 222 is connected to the motor 32 via a clutch 229, and the battery 36 is connected to the motor 32 via the inverter 34, as shown in a hybrid vehicle 220 of a modification example in FIG. 7. Example of the hybrid vehicle also includes a configuration in which the motor 32 is connected to the drive shaft 26 coupled to the drive wheels 22a, 22b, a generator 324 is connected to an engine 322, and the battery 36 is connected to the motor 32 and the generator 324 via the inverters 34, 326, as shown in a hybrid vehicle 320 of a modification example in FIG. 8.

The correspondence between the main elements of the embodiment and the main elements of the present disclosure described in the Summary section will be described. In the first and second embodiments, the motor 32 corresponds to the "drive device", and the electronic control unit 50 corresponds to the "control device".

The correspondence between the main elements of the embodiment and the main elements of the present disclosure described in the Summary section is not construed to limit elements of the present disclosure described in the Summary section, since the embodiment is an example to specifically describe the mode for carrying out the present disclosure described in the Summary section. That is, the interpretation of the present disclosure described in the Summary section should be made based on the description of the section, and the embodiment is only the specific example of the present disclosure described in the Summary section.

As described above, the aspect of implementing the present disclosure has been described using the embodiment. However, an applicable embodiment of the present disclosure is not limited to the embodiments above, and various modifications could be made without departing from the scope of the present disclosure.

The present disclosure can be used in the manufacturing industry of vehicles.

What is claimed is:

1. A vehicle comprising:
   a drive device for traveling; and
   a control device configured to control the drive device so that the vehicle travels with a target driving force based on an accelerator operation amount,
   wherein the control device is configured to set the target driving force such that a change in the target driving force with respect to a change in the accelerator operation amount is gentler in a case where steady traveling is desired as compared with a case where the steady traveling is not desired, and
   wherein the control device is configured to set a request driving force for traveling based on the accelerator operation amount and a vehicle speed or a driving force obtained by performing smoothing on the request driving force as the target driving force, and determine that the steady traveling is desired in a case where a difference between the request driving force and travel resistance is equal to or smaller than a predetermined difference.

2. The vehicle according to claim 1, wherein the control device is configured to determine that the steady traveling is desired in a case where the difference between the request driving force and the travel resistance is equal to or smaller than the predetermined difference and a variation amount of the accelerator operation amount for a predetermined time is equal to or smaller than a predetermined variation amount.

* * * * *